(12) United States Patent
Zhang et al.

(10) Patent No.: US 11,934,871 B1
(45) Date of Patent: Mar. 19, 2024

(54) TASK SCHEDULING METHOD AND APPARATUS, ELECTRONIC DEVICE, AND READABLE STORAGE MEDIUM

(71) Applicant: INSPUR SUZHOU INTELLIGENT TECHNOLOGY CO., LTD., Jiangsu (CN)

(72) Inventors: Yaqiang Zhang, Shandong (CN); Ruyang Li, Shandong (CN); Yaqian Zhao, Shandong (CN); Rengang Li, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/037,414

(22) PCT Filed: Sep. 29, 2021

(86) PCT No.: PCT/CN2021/121894
§ 371 (c)(1),
(2) Date: May 17, 2023

(87) PCT Pub. No.: WO2022/252456
PCT Pub. Date: Dec. 8, 2022

(30) Foreign Application Priority Data

Jun. 1, 2021 (CN) .......................... 202110606786.1

(51) Int. Cl.
*G06F 9/48* (2006.01)
(52) U.S. Cl.
CPC .................................. *G06F 9/4881* (2013.01)
(58) Field of Classification Search
CPC .................................................... G06F 9/4881
See application file for complete search history.

(56) References Cited

U.S. PATENT DOCUMENTS

2020/0073710 A1  3/2020  Xin et al.

FOREIGN PATENT DOCUMENTS

| CN | 109918201 A | 6/2019 |
| CN | 109918205 A | 6/2019 |

(Continued)

OTHER PUBLICATIONS

Chunhe Song, et al. Edge Computing Model and Verification Method of Industrial Internet Intelligent Manufacturing. Automation Panorama, Jan. 2020, pp. 49-51. Jan. 15, 2020.

*Primary Examiner* — Wissam Rashid
(74) *Attorney, Agent, or Firm* — IPro, PLLC (57) ABSTRACT

A task scheduling method includes: when a task requirement is obtained, splitting the task requirement to obtain the plurality of subtasks having a constraint relationship; performing execution condition detection on non-candidate subtasks, determining a non-candidate subtask that satisfies an execution condition as a candidate subtask, and putting the candidate subtask into a task queue; performing state detection on a server network composed of edge servers to obtain server state information and communication information; inputting the server state information, the communication information, and queue information corresponding to the task queue into an action value evaluation model to obtain the plurality of evaluated values respectively corresponding to the plurality of scheduling actions; and determining a target scheduling action from the plurality of scheduling actions by using the evaluated values, and scheduling the candidate subtask in the task queue on the basis of the target scheduling action.

20 Claims, 3 Drawing Sheets

(56) References Cited

FOREIGN PATENT DOCUMENTS

| | | |
|---|---|---|
| CN | 110830294 A | 2/2020 |
| CN | 111427679 A | 7/2020 |
| CN | 112328378 A | 2/2021 |
| CN | 113254178 A | 8/2021 |

TASK SCHEDULING METHOD AND APPARATUS, ELECTRONIC DEVICE, AND READABLE STORAGE MEDIUM

CROSS-REFERENCE TO RELATED APPLICATION

This application claims the priority of the Chinese Patent application filed on Jun. 1, 2021 before the CNIPA, China National Intellectual Property Administration with the application number of 202110606786.1, and the title of "TASK SCHEDULING METHOD AND APPARATUS, ELECTRONIC DEVICE AND READABLE STORAGE MEDIUM", which is incorporated herein in its entirety by reference.

FIELD

The present disclosure relates to the technical field of edge computing and, more particularly to a method for task scheduling, an apparatus for task scheduling, an electronic device and a computer-readable storage medium.

BACKGROUND

Development of edge computing (EC) technologies has effectively alleviated severe challenges faced by cloud computing in terms of utilization efficiency of network resources and quality of user experience. However, the edge computing is facing an important challenge in optimization of response to users' demand. There are more stringent requirements for network services from users, especially in terms of service response speed, coverage, connectivity and others that affect the quality of user experience. In order to improve a response speed to users' demand, requirements submitted by respective users are scheduled on a single edge server in related art. However, with more complex and diverse functions and logics of service businesses and more personalized demands sent by the users to a service network, it is generally required to process and aggregate different tasks. Therefore, scheduling methods in related art, which are only based on priority, are not an optimal scheduling method in most cases, which results in low efficiency of the edge computing network and a slow response speed to users' demands.

SUMMARY

In view of the above, an object of the present disclosure is to provide a method for task scheduling, an apparatus for task scheduling, an electronic device and a computer-readable storage medium, which improve efficiency of an edge server and reduce time required to complete task requirements.

In order to solve above technical problems, a method for task scheduling is provided in the present disclosure, which includes:

splitting a task requirement to obtain a plurality of subtasks with constraint relationships when the task requirement is acquired;

performing execution condition detection on a non-candidate subtask, determining the non-candidate subtask that meets execution conditions as a candidate subtask, and placing the candidate subtask into a task queue;

performing state detection on a server network composed of edge servers to obtain server state information and communication information;

inputting the server state information, the communication information and queue information corresponding to the task queue into an action value evaluation model to obtain a plurality of evaluation values corresponding to a plurality of scheduling actions; and determining a target scheduling action among the plurality of scheduling actions by using the evaluation values, and scheduling the candidate subtask in the task queue based on the target scheduling action.

In some embodiments, performing the execution condition detection on the non-candidate subtask includes:

judging whether the non-candidate subtask is a requirement starting task;

determining that the non-candidate subtask meets the execution condition when the non-candidate subtask is the requirement starting task;

judging whether preorder tasks of the non-candidate subtask are all completely executed when the non-candidate subtask is not the requirement starting task;

determining that the non-candidate subtask meets the execution condition when the preorder tasks are all completely executed; and determining that the non-candidate subtasks do not meet the execution condition when the preorder tasks are not all completely executed.

In some embodiments, performing the state detection on the server network composed of edge servers to obtain the server state information and the communication information includes:

performing remaining calculation time detection on the edge servers to obtain the server state information; and performing remaining transmission time detection on network channels in the server network to obtain the communication information.

In some embodiments, a training process of the action value evaluation model includes:

acquiring a plurality of training data, and inputting the plurality of training data into an initial network to obtain a plurality of training evaluation values corresponding to the training data;

determining target training scheduling action by using the training evaluation values, performing task scheduling according to the target training scheduling action, and obtaining a performance parameter corresponding to the respective training data;

obtaining a target evaluation value by using the performance parameter, and obtaining a loss value by using the training evaluation values and the target evaluation value; and updating the initial network by using the loss value, and obtaining the action value evaluation model by iterative training.

In some embodiments, acquiring the plurality of training data includes:

judging whether a number of candidate training data reaches a sampling threshold;

generating new candidate training data by using the training data and the performance parameter corresponding to a last training round when the number of candidate training data reaches the sampling threshold, and randomly selecting a sampling threshold number of training data from the candidate training data;

determining latest candidate training data from the candidate training data when the number of candidate training data does not reach the sampling threshold, and inputting the latest candidate training data into the initial network to obtain the plurality of training evaluation values corresponding to respective scheduling actions;

determining a training scheduling action by using the training evaluation values, and performing the task scheduling based on the training scheduling action;

performing state detection on the server network after the task scheduling is carried out, and generating post-scheduling environment information by using obtained post-scheduling state information, post-scheduling communication information and post-scheduling queue information corresponding to the task queue; and obtaining a training performance parameter corresponding to the training scheduling action by using the post-scheduling environmental information, generating the target training data by using the training performance parameter, the post-scheduling environmental information, the training scheduling action and the latest candidate training data, and determining the target training data as the candidate training data.

In some embodiments, obtaining the training performance parameter corresponding to the training scheduling action by using the post-scheduling environmental information includes:

obtaining a task processing delay by using data processing time and data transmission time of the subtasks to be scheduled involved in the training scheduling action;

performing remaining calculation time detection on servers to be scheduled involved in the training scheduling action to obtain the remaining calculation time;

adding the task processing delay and the remaining calculation time to obtain task delays corresponding to the servers to be scheduled; and obtaining an average delay by using the task delays, and determining the average delay as the training performance parameter.

In some embodiments, splitting the task requirement to obtain the plurality of subtasks with constraint relationships includes:

performing subtask detection on the task requirement to obtain the plurality of subtasks; and performing input data and output data detection on the plurality of subtasks to obtain a detection result, and obtaining the constraint relationships among the subtasks based on the detection result.

The present disclosure further provides an apparatus for task scheduling, including:

a splitting module configured to split a task requirement to obtain a plurality of subtasks with constraint relationships when the task requirement is acquired;

a queue updating module configured to perform execution condition detection on a non-candidate subtask, determine the non-candidate subtask that meets execution conditions as a candidate subtask, and place the candidate subtask into a task queue;

a state detection module configured to perform state detection on a server network composed of edge servers to obtain server state information and communication information;

an action evaluation module configured to input the server state information, the communication information and queue information corresponding into the task queue to an action value evaluation model to obtain a plurality of evaluation values corresponding to a plurality of scheduling actions; and a scheduling module configured to determine a target scheduling action among the plurality of scheduling actions by using the evaluation values, and schedule the candidate subtask in the task queue based on the target scheduling action.

The present disclosure further provides an electronic device, including a memory and a processor, wherein:

the memory is configured for storing a computer program; and the processor is configured for executing the computer program to realize the method for task scheduling stated above.

The present disclosure further provides a computer-readable storage medium, applied for storing a computer program, wherein the computer program, when executed by a processor, implements the method for task scheduling stated above.

With the method for task scheduling according to the present disclosure, when the task requirement is acquired, the task requirement is split to obtain a plurality of subtasks with constraint relationships. Execution condition detection is performed on a non-candidate subtask, the non-candidate subtask that meets execution conditions is determined as a candidate subtask, and the candidate subtask is placed into a task queue. State detection is performed on a server network composed of edge servers to obtain server state information and communication information. The server state information, the communication information and queue information corresponding to the task queue are input into an action value evaluation model to obtain a plurality of evaluation values corresponding to a plurality of scheduling actions. A target scheduling action is determined among the plurality of scheduling actions by using the evaluation values, and the candidate subtask in the task queue is scheduled based on the target scheduling action.

It may be seen that in this method, the user's task requirement is not regarded as a whole, but the subtasks that make up the task requirement are split and are scheduled, to achieve effect of scheduling a plurality of task requirements in a decision-making stage and improve efficiency of the edge computing network to a greatest extent. The plurality of subtasks may be obtained by splitting the task requirements, and constraint relationships exist among the subtasks, for constraining an execution order of a subtask. By detecting the execution condition of the non-candidate subtask to judge whether it may start to be executed, it may be placed into the task queue and waits for scheduling when it meets the execution condition. By detecting the server network, the server state information that characterizes a load state of the edge server and the communication information that represents network communication pressures among the servers may be obtained. The queue information of the task queue may represent a situation of tasks that may be executed. With the queue information, the communication information and the server state information being input into the action value evaluation model, the evaluation values may be obtained by evaluating effects of various feasible scheduling actions based on the above information by using the action value evaluation model. According to the evaluation value, the optimal target scheduling action under current situation may be selected from the plurality of scheduling actions, and the candidate subtasks in the task queue may be scheduled based on the optimal target scheduling action. By splitting the requirement of the user, candidate subtasks constituting different task requirements are scheduled on the plurality of edge servers in parallel according to states and network communication pressures of the plurality of edge servers and situations of subtasks that may be executed, and the plurality of task requirements are executed in parallel by using the plurality of edge servers. With this scheduling method, scheduling of the task requirements may be may further refined, further improving task execution efficiency, improving the efficiency of the edge server, reducing time required to complete the task requirements, and thus improving the response speed to the task requirement, and solving the problems of low efficiency of the edge computing network and slow response speed to the user demands in related art.

In addition, an apparatus for task scheduling, an electronic device and a computer-readable storage medium are further provided, which also have above beneficial effects.

BRIEF DESCRIPTION OF THE DRAWINGS

In order to more clearly explain the technical solution in the embodiment or the existing technology of the present disclosure, the following will briefly introduce the drawings that need to be used in the embodiment or the existing technology description. Obviously, the drawings in the following description are only the embodiment of the present disclosure. For a person skilled in the art, other drawings may be obtained according to the provided drawings without paying creative labor.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
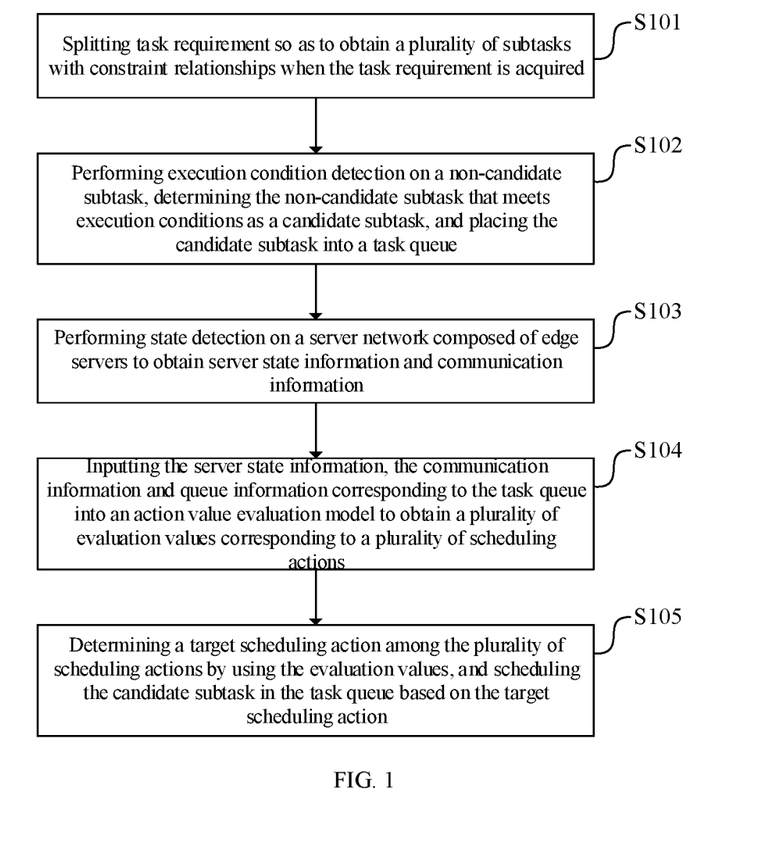
FIG. 1 is a flowchart of a method for task scheduling according to an embodiment of the present disclosure.

Reference is made to FIG. 1, which is a flowchart of a method for task scheduling according to an embodiment of the present disclosure. The method includes following steps S101 to S105.

In step S101, when the task requirement is acquired, the task requirement is split to obtain a plurality of subtasks with constraint relationships.

The task requirement refers to a computing task that users want to perform by using an edge computing network. By realizing the task requirement, the users may get desired data or complete desired operations. With development of edge computing, functions and logics of service it may provide become more and more complex, which need to be composed of the plurality of different subtasks. By completing the subtasks, the task requirement may be completed. In the present embodiment, the task requirement includes a plurality of subtasks, certain constraint relationships exist among the subtasks.

Constraint relationships are configured to constrain execution orders, input data and execution intervals of the subtasks, and their categories and numbers are not limited. By the constraint relationships, positions of the subtasks in the whole task requirement may be determined, and then it may be determined which subtasks should be executed under current situation according to a completion progress of the whole task requirement and the positions of the subtasks in the task requirement. The constraint relationships may be expressed in any form, such as in a directed acyclic graph or in a formula.

Figure 2:
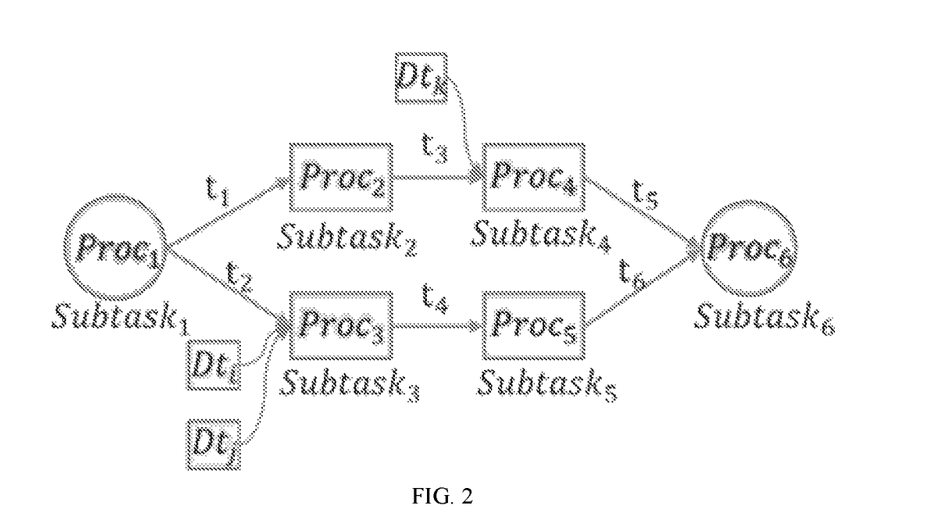
FIG. 2 is a directed acyclic graph corresponding to a task requirement according to an embodiment of the present disclosure.

An acquisition manner of the task requirement is not limited in the present embodiment. In an implementation, a task request sent by a terminal may be acquired and parsed to obtain the task requirement. In another implementation, a specified path may be scanned and data at the specified path may be determined as the task requirement. Further, execution timing of a step of acquiring the task requirement is not limited in the present embodiment, and it may be executed in real time or periodically. There may be one or more task requirements acquired each time. It is necessary to split the task requirement after obtaining it, so it is understood that data expression of the task requirement should conform to preset rules, so that the task requirement may be split according to the preset rules after obtaining it, to obtain corresponding subtasks with constraint relationships. Content of the preset rules is not limited in the present embodiment, which may be set as required. In an implementation, the preset rules may be directed acyclic graph rules, that is, the subtasks are regarded as vertexes of the directed acyclic graph and relationships between the subtasks are regarded as directed edges to generate the corresponding task requirement. Reference is made to FIG. 2, which is a directed acyclic graph corresponding to a task requirement according to an embodiment of the present disclosure. The task requirement Req may be expressed as:

$$Req=\{\{SubTask_k\}_{k\in K}, \{t_w\}_{w\in W}\}$$

wherein $Subtask_k$ represents a k-th subtask, with a total of K subtasks, $t_w$ represents timing constraint and logical sequence constraint between the subtasks, and W represents a set of edges.

For each subtask, it may be obtained:

$$SubTask_i=\{\{Dt_n\}_{n\in N}, \{t_w\}_{w\in W_i}, Proc\}$$

wherein $Dt_n$ is input data obtained from other edge servers required by the subtask, N is a set of edge servers, $Dt_n$ is input data obtained from an n-th edge server, and Proc is a request of the subtask for computing resources of the edge server. $W_i$ is a set of timing constraints and logical sequence constraints corresponding to an i-th subtask.

As may be seen from FIG. 2, constraint between $Subtask_1$ and $Subtask_2$ is t1, which means that a maximum value of a time interval from ending of a subtask numbered 1 to starting of a subtask numbered 2 is t1. Meanwhile, it may be seen that a subtask numbered 3 takes an execution result of the subtask numbered 1 as input data, and also obtains data from edge servers numbered i and j as input data respectively.

A manner for splitting the task requirement is not limited in the present embodiment. In an implementation, subtasks and corresponding constraint relationships may be directly included in the task requirement. In another implementation, a process in which the task requirement is split to obtain the plurality of subtasks with constraint relationships may include following steps 11 and 12.

In step 11, subtask detection is performed on the task requirement to obtain a plurality of subtasks.

In step 12, input data and output data detection is performed on the plurality of subtasks to obtain a detection result, and the constraint relationships among the subtasks are obtained based on the detection result.

In the present embodiment, the task requirement includes the subtasks and input and output information of the subtasks, and the subtasks that constitutes the task requirement may be obtained by performing subtask detection on the task requirement. A manner of the subtask detection is not limited. A manner of the subtask detection varies depending on different representations of subtasks. For example, when a subtask is marked with {}, a symbol {} in the task requirement may be detected and data in this symbol may be determined as data corresponding to the subtask. The input data and output data detection refers to detection on the input data required to identify the subtask and the output data obtained. Because the subtasks jointly complete the whole task requirement, execution results of a part of the subtasks must be the input data of another part of the subtasks. By the detection of the input data and the output data, corresponding detection results may be obtained, and then relationships between the subtasks are determined according to the detection results, that is, the constraint relationships between the subtasks may be obtained. By this embodiment, the constraint relationships between the subtasks may be directly and accurately obtained and thus correct execution of the task requirement may be ensured.

In step S102, execution condition detection is performed on a non-candidate subtask, the non-candidate subtask that meets execution conditions is determined as a candidate subtask, and the candidate subtask is placed into a task queue.

The non-candidate subtask, that is, a subtask that is not placed into the task queue, and is a task that cannot be executed before a current scheduling. The non-candidate subtask may be a subtask obtained by splitting a newly acquired task requirement after a last task scheduling and before the current task scheduling; because it is acquired after the last scheduling, it cannot be executed before the current scheduling. Or it may be a subtask that exists before the last task scheduling but could not be executed; although it exists at the last scheduling, it could not be executed, for which a reason is that its corresponding preorder tasks are not completely executed, and input data required for execution of the subtask is insufficient, and thus it may also not be executed.

In performing a new scheduling, it is necessary to determine which subtasks may be executed so that they may be deployed on various edge servers for subsequent execution. Therefore, it is necessary to perform execution condition detection on the non-candidate subtask to determine whether any of non-candidate subtasks meets the execution condition in the current scheduling. After the detection, a non-candidate subtask that meets the execution condition is determined as a candidate subtask, and the candidate subtask refers to a task that may be executed. By placing the candidate subtask into the task queue, situations of the subtasks that needs to be scheduled may be determined subsequently by detecting queue information of the task queue in the future, and the subtasks may be scheduled reasonably according to the situations. A form of the task queue is not limited in the present embodiment. In order to improve a feedback speed for the task requirement, a first-in first-out mode may be adopted for the task queue.

A manner of executing the condition detection is not limited in the present embodiment. In an implementation, it may be judged whether there is an executable mark for a respective non-candidate subtask, and when the executable mark exists, it is determined that the non-candidate subtask meets the execution condition, and the executable marks may be generated according to input instruction. In another implementation, it may be judged whether input data of the respective non-candidate subtask is complete, and when it is complete, the respective non-candidate subtask may be determined to meet the execution condition. In order to improve a speed of execution condition detection and thus improve a task scheduling speed, the process of performing the execution condition detection on the non-candidate subtask may include following steps 21 to 25.

In step 21, it is judged whether the non-candidate subtask is a requirement starting task.

In step 22, when the non-candidate subtask is the requirement starting task, it is determined that the non-candidate subtask meets the execution condition.

In step 23, when the non-candidate subtask is not the requirement starting task, it is judged whether preorder tasks of the non-candidate subtask are all completely executed.

In step 24, when the preorder tasks are all completely executed, it is determined that the non-candidate subtask meets the execution condition.

In step 25, when the preorder tasks are not all completely executed, it is determined that the non-candidate subtasks do not meet the execution condition.

Above steps are described in detail. Firstly, the requirement starting task refers to a first subtask to be executed in the task requirement. This subtask is beginning of a whole task requirement process, and there is no input data generated by other subtasks in its input data, but its input data has been determined when the task requirement is determined, so the requirement starting task may be directly executed in any case. When it is detected that the non-candidate subtask is the requirement starting task, it may be directly determined that the non-candidate subtask meets the execution condition. When the non-candidate subtask is not the requirement starting task, it is necessary to judge whether input data required for its execution is complete, and to determine whether its preorder tasks are all completely executed. A preorder task refers to a subtask that has a direct constraint relationship with a certain subtask and is located before the subtask in a task logical order. Referring to FIG. 2, for the subtask numbered 2, the subtask numbered 1 is its corresponding preorder task; for a subtask numbered 5, the subtask numbered 3 is its corresponding preorder task, while the subtask numbered 1 is not its corresponding preorder task. When the preorder tasks are all completely executed, it means that input data required by the non-candidate subtask is complete, and it may be determined that the non-candidate subtask meets the execution condition, otherwise it does not meet the execution condition.

In step S103, state detection is performed on a server network composed of edge servers to obtain server state information and communication information.

In the present embodiment, there are a plurality of edge servers, and the plurality of edge servers constitute a server network, jointly participate in task scheduling, and accomplish the plurality of task requirements in parallel. It is necessary to schedule the respective candidate subtasks reasonably according to a state of the server network (that is, an edge computing network) in performing task scheduling, and thus it is necessary to perform state detection on the server network to obtain the server state information corresponding to the edge server and the communication information of the server network. The server state information refers to information reflecting a load pressure of the server, which may be information about remaining computing time of the server, and usage rate information of the processor, etc., and its content may be set as required. The communication information refers to information that reflects usage of the network channels in the server network, which may be bandwidth usage rate information of the network channel, remaining transmission time of the network channel, etc. Similarly, its content may be set as required. Because the server state information may represent the condition of the load pressure of the edge server, the communication information may reflect the condition of the communication between servers in the network, and time required for completion of executing the candidate subtask is related to the load pressure of the server and a transmission speed of data in a cluster. Therefore, the server state information and the communication information, as basic information for efficient scheduling, may be used for subsequent efficient and accurate task scheduling.

It should be noted that, in terms of execution timing of the state detection, in an implementation, the state detection may be performed in real time, so that the server state information and the communication information may be updated in real time and may be used directly during scheduling. In another implementation, the state detection may be performed when a need for scheduling is detected, to reduce consumption of computing resources. Further, an execution order of step S102 and step S103 is not limited, and they may be executed in series or in parallel, and an execution order in serial execution is also not limited. A mark of scheduling start is also not limited in the present embodiment. In an implementation, scheduling may be considered to start when the task requirement is obtained. In another implementation, scheduling may be considered to start when instruction for the execution condition detection is detected, or when instruction for the state detection is detected in a case that the server state information and the communication information are not updated in real time. In the present embodiment, a step of acquiring and splitting the task requirement may be performed at any time.

In the present embodiment, a detection manner of the state detection is not limited, which may vary depending on content of the server state information and the communication information. For example, in an implementation, a process of performing the state detection on the server network composed of the edge servers to obtain the server state information and communication information may include following steps 31 and 32.

In step 31, remaining calculation time detection may be performed on the edge servers to obtain the server state information.

In step 32, remaining transmission time detection is performed on network channels in the server network to obtain the communication information.

In the present embodiment, the remaining calculation time detection is used to detect remaining time required to complete the subtask currently being processed under current situation to obtain remaining calculation time. The remaining computing time is also time that the candidate subtask wait to be executed after being deployed to the edge server. Similarly, the remaining transmission time is remaining time required for the two edge servers to complete transmission of data currently being transmitted. By the remaining transmission time detection on the network channels to obtain the remaining transmission time, time required to wait in obtaining input data from another edge server when the subtask is executed on one edge server may be determined. The remaining calculation time and the remaining transmission time may accurately characterize a load pressure of the edge server and a transmission pressure of the network channel.

In step S104, the server state information, the communication information and queue information corresponding to the task queue are input into an action value evaluation model to obtain a plurality of evaluation values corresponding to a plurality of scheduling actions.

After the server state information and communication information are obtained and the task queue is updated, the server state information, the communication information and the queue information of the task queue may be input into the action value evaluation model, to obtain the evaluation values used to characterize a cluster state after scheduling by adopting various scheduling actions under the current condition.

The queue information refers to information that reflects task situations of the respective candidate subtasks in the task queue, including data amount of the input data of the candidate subtasks and allowable waiting time corresponding to the candidate subtasks. The allowable waiting time may also be called a most urgent timing constraint. Because execution time intervals between the preorder tasks and the candidate subtask cannot be too large, when there are a plurality of preorder tasks, a maximum threshold for timing constraint between the respective preorder tasks and the candidate subtask may be different, and complete execution time of the preorder tasks may also be different. In this case, a most urgent timing constraint corresponding to the candidate subtask is a minimum value among the timing constraints when the preorder tasks are all completely executed. Therefore, within the allowable waiting time, the candidate subtask must be started to execute. It may be understood that because the first-in first-out mode is adopted for the task queue and each of the edge servers may only process one subtask at a time, the queue information may correspond to a top target number of candidate subtasks in the task queue, and the target number is a number of the edge servers.

By combining the server state information, the communication information and the queue information, the load pressure of the edge server, a data transmission pressure between servers, the condition of urgency of the candidate subtasks and data transmission demand may be defined, under which values of respective scheduling modes (that is, scheduling actions) may be evaluated by using the action value evaluation model to get corresponding evaluation values. Each scheduling action may lead to a corresponding scheduling result, and task execution time corresponding to the scheduling result corresponds to a value of the scheduling action. The shorter the task execution time, the more effective the scheduling is and the higher the value of the scheduling action is. On the contrary, the more ineffective the scheduling is, the lower the value of the scheduling action is. Therefore, by the evaluation values, values of the scheduling actions under the current situation may be determined, and then an appropriate scheduling action may be chosen for scheduling.

In step S105, a target scheduling action is determined among the plurality of scheduling actions by using the evaluation values, and the candidate subtask in the task queue are scheduled based on the target scheduling action.

A manner of determining the target scheduling action is not limited in the present disclosure, and the way of determining the target scheduling action may vary depending on different calculation manners of the evaluation values. In an implementation, a scheduling action corresponding to a minimum evaluation value or a maximum evaluation value may be determined as the target scheduling action. In another embodiment, a greedy algorithm (e.g. ∈-greedy algorithm) may be used to determine the target value from a plurality of evaluation values, and a scheduling action corresponding to the target value may be determined as the target scheduling action. The target scheduling action is an optimal scheduling action under the current situation, so the candidate subtasks may be scheduled based on the target scheduling action.

With the method for task scheduling provided in the embodiment of the present disclosure, the user's task requirement is not regarded as a whole, but the subtasks that make up the task requirement are split and are scheduled, to achieve effect of scheduling a plurality of task requirements in a decision-making stage and improve efficiency of the edge computing network to a greatest extent. The plurality of subtasks may be obtained by splitting respective task requirements, and constraint relationships exist among subtasks, for constraining an execution order of a subtask. By detecting the execution condition of the non-candidate subtask to judge whether it may start to be executed, it may be placed into the task queue and waits for scheduling when it meets the execution condition. By detecting the server network, the server state information that characterizes a load state of the edge server and the communication information that represents network communication pressures among respective servers may be obtained. The queue information of the task queue may represent a situation of tasks that may be executed. With the queue information, the communication information and the server state information being input into the action value evaluation model, the evaluation values may be obtained by evaluating effects of various feasible scheduling actions based on the above information by using the action value evaluation model. According to the evaluation value, the optimal target scheduling action under current situation may be selected from the plurality of scheduling actions, and the candidate subtasks in the task queue may be scheduled based on the optimal target scheduling action. By splitting the requirement of the user, candidate subtasks constituting different task requirements are scheduled on the plurality of edge servers in parallel according to states and network communication pressures of the plurality of edge servers and situations of subtasks that may be executed, and the plurality of task requirements are executed in parallel by using the plurality of edge servers. With this scheduling method, scheduling of the task requirements may be may further refined, further improving task execution efficiency, improving the efficiency of the edge server, reducing time required to complete the task requirements, and thus improving the response speed to the task requirement, and solving the problems of low efficiency of the edge computing network and slow response speed to the user demands in related art.

Based on the above embodiments, it may be understood that a task scheduling model may be trained to obtain the action value evaluation model before performing task scheduling by using the action value evaluation model. A training manner and process of the action value evaluation model are not limited in the present embodiment. In an implementation, the training process of the action value evaluation model may include following steps 41 to 44.

In step 41, a plurality of training data are acquired and the plurality of training data are input into an initial network to obtain a plurality of training evaluation values corresponding to the training data.

The initial network is a network model that is not completely trained, and when it is trained to achieve convergence, it may be transformed into the action value evaluation model. Content of the training data is not limited, but it may be understood that there must be training environment information, which includes server state information, communication information and queue information that are used for training. After the training data is obtained, the training data is input into the initial network for processing to obtain the plurality of training evaluation values corresponding to the training data. A generation process of the training evaluation values is the same as that of the evaluation values in the above embodiment.

A form and architecture of the initial network is not limited in the present embodiment. In an implementation, the initial network is a deep neural network (DNN), which may be represented by QN, with its parameter being represented by ω. As for an acquisition manner of the training data, in a feasible implementation, externally input data may be acquired as the training data. In another feasible implementation, because a task scheduling process is complicated and quality of the training data has great influence on performance of the model, in order to obtain accurate training data, a process of acquiring the plurality of training data may include following steps 51 to 56.

In step 51, it is judged whether a number of candidate training data reaches a sampling threshold.

Because a whole training process consists of the plurality of rounds of iterative training processes and the plurality of training data are used in each round of training, a number of the training data is the sampling threshold, which may be expressed by M. In acquiring the training data, it is firstly necessary to judge whether there is enough training data for acquisition, thus it is judged whether the number of candidate training data reaches the sampling threshold. The candidate training data refers to data that may be selected as the training data. The candidate training data may be placed in a cache pool, and a size of the cache pool may be D. Theoretically, D should be much larger than M.

In step 52, when the number of candidate training data reaches the sampling threshold, new candidate training data is generated by using the training data and the performance parameter corresponding to a last training round, and a sampling threshold number of training data may be randomly selected from the candidate training data.

When the number of candidate training data reaches the sampling threshold, it indicates that there is enough candidate data, and some of them may be selected as the training data. In this case, in order to expand the candidate training data, new candidate training data may be generated by using the training data used in the last training round and the corresponding performance parameter, to expand the candidate training data. A generation process of the new candidate training data is the same as that of subsequent target training data, which may be explained later.

In addition, in order to prevent strong correlation between training data and improve effect of model training, a sampling threshold number of candidate training data may be selected in a random manner as the training data of this round of training.

In step 53, when the number of candidate training data does not reach the sampling threshold, latest candidate training data may be determined from the candidate training data, and be input into the initial network to obtain the plurality of training evaluation values corresponding to the respective scheduling actions.

When the number of candidate training data does not reach the sampling threshold, it indicates that the current number of candidate training data is insufficient to support start of a round of training. In this case, in order to ensure accuracy of the training data, the training data may be generated by the initial network. The newly generated candidate training data is acquired and used as a basis for generating the target training data, which is then input into the initial network for processing by using the initial model to obtain a corresponding plurality of training evaluation values.

In the present embodiment, the following $$S_t = \{CP_i^t, L_{i,j}^t, RT_t\}_{i,j \in N}$$

may be used to represent the candidate training data and the training data, and in this implementation, it may also be used to represent the latest candidate training data. $CP_i^t$ is the server state information, which represents a load pressure of an i-th edge server at a moment t, and a dimension of $CP_i^t$ is 1*N because there are N edge servers in total, and each element represents a load pressure of one edge server, which for example may be a next idle moment of the edge server. $L_{i,j}^t$ is the communication information, which represents a data transmission pressure of a communication channel in a direction from the i-th edge server to a j-th edge server, which for example may be a next idle moment of the channel. Because the communication channel is bidirectional, the situation of which is different, a dimension of the communication information is N*N. $RT_t$ is the queue information, and in the present embodiment, it is information corresponding to the first N candidate subtasks in the task queue. A dimension of the queue information may be 2*N, wherein the elements of the first column represent allowable waiting time corresponding to the candidate subtasks, and the elements of the second column represent data amount of the input data corresponding to the candidate subtasks. The queue information is input into the QN network to obtain the training evaluation values corresponding to the scheduling actions, which may be called Q values. Sizes of the Q values may vary depending on different input data, model parameters and scheduling actions.

In the step 54, a training scheduling action may be determined by using the training evaluation values, and the task scheduling may be performed based on the training scheduling action.

After the training evaluation values are obtained, they may be processed by using the greedy algorithm to obtain the corresponding target value, and the scheduling action corresponding to the target value is determined as the training scheduling action. The training scheduling action may be represented by $A_t$. After the training scheduling action is determined, the task scheduling is performed based on a state transition equation $P_t$, wherein:

$$P_t = P[S_{t+1}|S_t, A_t]$$

It shows the probability distribution of transition to a next environmental state $S_{t+1}$ after performing the training scheduling action $A_t$ at an $S_t$ state.

In the step 55, state detection is performed on the server network after the task scheduling is carried out, and post-scheduling environment information may be generated by using obtained post-scheduling state information, post-scheduling communication information and post-scheduling queue information corresponding to the task queue.

After scheduling based on the training scheduling action, the cluster state is changed, the changed cluster state may be represented by $S_{t+1}$. At a beginning of the next scheduling after finishing scheduling, the post-scheduling environment information i.e. $S_{t+1}$, may be generated by performing the state detection and acquiring information corresponding to the task queue after the scheduling, i.e. the post-scheduling queue information, and by using the post-scheduling queue information, the post-scheduling state information and the post-scheduling communication information.

In the step 56, a training performance parameter corresponding to the training scheduling action is obtained by using the post-scheduling environmental information, the target training data may be generated by using the training performance parameter, the post-scheduling environmental information, the training scheduling action and the latest candidate training data, and the target training data may be determined as the candidate training data.

After the post-scheduling environmental information is obtained, edge servers corresponding to the subtasks to be scheduled may be determined according to the post-scheduling environmental information, and then a corresponding training performance parameter may be calculated according to distribution of the subtasks to be scheduled, so that the target training data may be generated by using the training performance parameter, the post-scheduling environmental information, the training scheduling action and the latest candidate training data, and the target training data may be used as the new candidate training data to expand the candidate training data. The training performance parameter refers to a parameter that may characterize quality of the post-scheduling environmental information, and also characterize quality of the training scheduling action. In an application scenario of the present embodiment, the smaller the average time required for the edge computing network to perform the subtasks, the better the training scheduling action, and the larger the average time required for the edge computing network to perform the subtasks, the worse the training scheduling action. Therefore, the average time required for the edge computing network to perform the subtasks may be determined as the training performance parameter. A calculation manner of the training performance parameter is not limited in the present embodiment. It may be understood that the more accurate the calculation of the average time, the more accurate the training performance parameter and the higher the quality of the candidate training data. In an implementation, a process of obtaining the training performance parameter corresponding to the training scheduling action by using the post-scheduling environmental information may include the following steps 61 to 64.

In step 61, a task processing delay is obtained by using data processing time and data transmission time of the subtasks to be scheduled involved in the training scheduling action.

In the present embodiment, subtasks that participate in the scheduling in a training process are the subtasks to be scheduled. The time required for the edge server to execute the subtasks to be scheduled includes two parts, one part is the task processing delay for processing the subtasks to be scheduled, and the other part is task waiting time, which is the remaining calculation time and refers to time required for the edge server to complete currently unfinished tasks. The task waiting time of the second part may be obtained by remaining calculation time detection on the servers to be scheduled, which is not repeatedly described here again.

As for the task processing delay, it also consists of two parts, including processing time of processing the task and transmission time for obtaining required input data through data transmission. The task processing delay may be:

$$T(S) = T_{ij}(S) + TP(S), \ T_{ij}(S) = \frac{S}{B_{ij}} + d_{ij}, \ TP(S) = \frac{Z*S}{F}$$

wherein $T(S)$ is the task processing delay, $T_{ij}(S)$ is the transmission time, $TP(S)$ is the processing time, $S$ is the data amount of the input data of the subtasks to be scheduled, i and j represent numbers of edge servers, $B_{ij}$ represents a channel bandwidth between two edge servers, $d_{ij}$ represents an inherent delay of the channel, Z represents a number of processor cycles required to process unit data amount, and F represents a processor frequency.

In step 62, remaining calculation time detection is performed on servers to be scheduled involved in the training scheduling action to obtain the remaining calculation time.

In the present embodiment, $T_{waiting}$ may be used to represent the remaining calculation time.

In step 63, the task processing delay and a corresponding remaining calculation time are added to obtain task delays corresponding to the servers to be scheduled.

The task delay is:

$$D_n^t = T(S) + T_{waiting}$$

It represents total time from a moment t at which an edge server numbered n starts the subtasks to be scheduled to a moment t at which the subtasks to be scheduled are completely executed. $T_{waiting}$ is remaining calculation time corresponding to the edge server numbered n, and $T(S)$ is a task processing delay corresponding to subtasks to be scheduled allocated by the edge server numbered n.

In the step 64, an average delay is obtained by using the task delays, and the average delay is determined as the training performance parameter.

After obtaining the task delays corresponding to the edge servers, the average delay is calculated by using the task delays and determined as the training performance parameter. The average delay may be expressed by $R_{t+1}$, wherein:

$$R_{t+1} = \frac{1}{|N_t|} \sum_{n \in N_t} D_n^t, \ N_t \in N$$

wherein $N_t$ represents a set of edge servers participating in the scheduling, and $|N_t|$ represents a number of edge servers in $N_t$. It may be seen that the smaller the training performance parameter is, the shorter the required calculation time is, and the better the scheduling action is. An ultimate object of the present disclosure is:

$$\min_{A_t, T \to \infty} \frac{1}{T} \sum_{t=0}^{T} \frac{1}{|N_t|} \sum_{n \in N_t} D_n^t$$

that is, to obtain a minimum total delay of multiple scheduling.

After the training performance parameter is obtained, the target training data $\{S_t, A_t, R_{t+1}, S_{t+1}\}$ is composed of the training performance parameter $R_{t+1}$, the post-scheduling environmental information $S_{t+1}$, the training scheduling action $A_t$ and the latest candidate training data $S_t$, and is put into the cache pool.

With technical solutions in above steps 51 to 56 and 61 to 64, acquisition of the training data may be completed. After the training data is input into the initial model, the corresponding training evaluation value may be obtained.

In step 42, the target training scheduling action is determined by using the training evaluation values, and task scheduling is performed according to the target training scheduling action, and a performance parameter corresponding to the training data may be obtained.

It should be noted that in the present embodiment, a manner of calculating the performance parameter by using the training evaluation values is the same as the manner of calculating the training performance parameter in the above steps, and the performance parameter may also be expressed by $R_{t+1}$. After the evaluation value is obtained, the evaluation value is processed based on the greedy algorithm to obtain the target training scheduling action $A_t$, and the target training scheduling action is performed to obtain the post-scheduling environmental information $S_{t+1}$, and the corresponding performance parameter $R_{t+1}$ may be generated.

In step 43, a target evaluation value is obtained by using the performance parameter, and a loss value is obtained using the training evaluation values and the target evaluation value.

After the performance parameter is obtained, the corresponding target evaluation value is generated by using the performance parameter, to generate the loss value. In the present embodiment, the target evaluation value may be expressed by $Q_{target}$, wherein:

$$Q_{target} = R_{t+1} + \gamma * \min_A(Q(S_{t+1}, A', \omega))$$

wherein $\gamma$ is a return discount factor, and $\min_A(Q(S_{t+1}, A', \omega))$ is a minimum value among the training evaluation values, which corresponds to a scheduling action A'. After the target evaluation value is obtained, the loss value L may be calculated by using the target evaluation value, wherein:

$$L = \frac{1}{M} \sum_{m=1}^{M} (Q_{target} - Q(S_m, A_m, \omega))^2$$

wherein m is a number of the training data in a current round of training, $A_m$ is a scheduling action obtained after processing of the training data numbered m by the initial model, and $S_m$ is a system environment parameter corresponding to the training data, that is, $S_t$ corresponding to the training data numbered m, which is denoted as $S_m$ herein.

In the step 44, the initial network is updated by using the loss value, and the action value evaluation model may be obtained by iterative training.

A manner of updating the initial network is not limited in the present embodiment, for example, the initial network may be updated based on gradient back propagation. After the initial network is updated for iterative training, that is, new training data is re-selected to repeat above training process until the initial model achieves convergence and is converted into the action value evaluation model.

In the following, an apparatus for task scheduling provided in the embodiment of the present disclosure is introduced, and the apparatus for task scheduling described below and the method for task scheduling described above may be referred to each other correspondingly.

Figure 3:
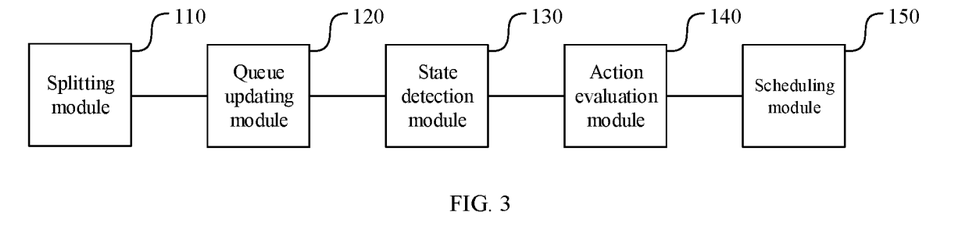
FIG. 3 is a schematic structural diagram of an apparatus for task scheduling according to an embodiment of the present disclosure.

Reference is made to FIG. 3, which is a schematic structural diagram of an apparatus for task scheduling provided in an embodiment of the present disclosure, which includes a splitting module 110, a queue updating module 120, a state detection module 130, an action evaluation module and a scheduling module 150.

The splitting module 110 is configured to split task requirement to obtain a plurality of subtasks with constraint relationships when the task requirement is acquired.

The queue updating module 120 is configured to perform execution condition detection on a non-candidate subtask, determine the non-candidate subtask that meets execution conditions as a candidate subtask, and place the candidate subtask into a task queue.

The state detection module 130 is configured to perform state detection on a server network composed of edge servers to obtain server state information and communication information.

The action evaluation module 140 is configured to input the server state information, the communication information and queue information corresponding to the task queue into an action value evaluation model to obtain a plurality of evaluation values corresponding to a plurality of scheduling actions.

The scheduling module 150 is configured to determine a target scheduling action among the plurality of scheduling actions by using the evaluation values, and schedule the candidate subtask in the task queue based on the target scheduling action.

Alternatively, the state detection module 130 includes an initial judgment unit, a first determining unit, a preorder judging unit, a second judging unit and a third judging unit.

The initial judgment unit is configured to judge whether the non-candidate subtask is a requirement starting task.

The first determining unit is configured to determine that the non-candidate subtask meets the execution condition when the non-candidate subtask is the requirement starting task;

The preorder judging unit is configured to judge whether preorder tasks of the non-candidate subtask are all completely executed when the non-candidate subtask is not the requirement starting task.

The second judging unit is configured to determine that the non-candidate subtask meets the execution condition when the preorder tasks are all completely executed.

The third judging unit is configured to determine that the non-candidate subtasks do not meet the execution condition when the preorder tasks are not all completely executed.

Alternatively, the state detection module 130 includes a remaining calculation time detection unit and a remaining transmission time detection unit.

The remaining calculation time detection unit is configured to perform remaining calculation time detection on the edge servers to obtain the server state information.

The remaining transmission time detection unit is configured to perform remaining transmission time detection on network channels in the server network to obtain the communication information.

Alternatively, the apparatus includes a training data input module, a performance parameter calculation module, a loss calculation module and an updating module.

The training data input module is configured to acquire a plurality of training data and input the plurality of training data into an initial network respectively to obtain a plurality of training evaluation values corresponding to the training data.

The performance parameter calculation module is configured to determine target training scheduling action by using the training evaluation values, perform task scheduling according to the target training scheduling action, and obtain a performance parameter corresponding to the respective training data.

The loss calculation module is configured to obtain a target evaluation value by using the performance parameter, and obtain a loss value by using the training evaluation values and the target evaluation value.

The updating module is configured to update the initial network by using the loss value, and obtain the action value evaluation model by iterative training.

Alternatively, the training data input module includes a threshold judging unit, a random selection unit, an input unit, a training scheduling action determining unit, a post-scheduling environment information generating unit and a target training data generating unit.

The threshold judging unit is configured to judge whether a number of candidate training data reaches a sampling threshold.

The random selection unit is configured to generate new candidate training data by using the training data and the performance parameter corresponding to a last training round when the number of candidate training data reaches the sampling threshold, and randomly select a sampling threshold number of training data from the candidate training data.

The input unit is configured to determine latest candidate training data from the candidate training data when the number of candidate training data does not reach the sampling threshold, and input the latest candidate training data into the initial network to obtain the plurality of training evaluation values corresponding to the respective scheduling actions.

The training scheduling action determining unit is configured to determine a training scheduling action by using the training evaluation values, and perform the task scheduling based on the training scheduling action.

The post-scheduling environment information generating unit is configured to perform state detection on the server network after the task scheduling is carried out, and generate post-scheduling environment information by using obtained post-scheduling state information, post-scheduling communication information and post-scheduling queue information corresponding to the task queue.

The target training data generating unit is configured to obtain a training performance parameter corresponding to the training scheduling action by using the post-scheduling environmental information, generate the target training data by using the training performance parameter, the post-scheduling environmental information, the training scheduling action and the latest candidate training data, and determine the target training data as the candidate training data.

Alternatively, the target training data generating unit includes a task processing delay calculation subunit, a remaining calculation time calculation subunit, a task delay calculation subunit and an average calculation subunit.

The task processing delay calculation subunit is configured to obtain a task processing delay by using data processing time and data transmission time of the subtasks to be scheduled involved in the training scheduling action.

The remaining calculation time calculation subunit is configured to perform remaining calculation time detection on servers to be scheduled involved in the training scheduling action to obtain the remaining calculation time.

The task delay calculation subunit is configured to add the task processing delay and the remaining calculation time to obtain task delays corresponding to the servers to be scheduled.

The average calculation subunit is configured to obtain an average delay by using the task delays, and determine the average delay as the training performance parameter.

Alternatively, the splitting module 110 includes a subtask detection unit and a constraint relation obtaining unit.

The subtask detection unit is configured to perform subtask detection on the task requirement to obtain the plurality of subtasks.

The constraint relation obtaining unit is configured to perform input data and output data detection on the plurality of subtasks to obtain a detection result, and obtain the constraint relationships among the subtasks based on the detection result.

In the following, an electronic device provided in the embodiment of the present disclosure is introduced, and the electronic device described below and the method for task scheduling described above may be referred to each other correspondingly.

Figure 4:
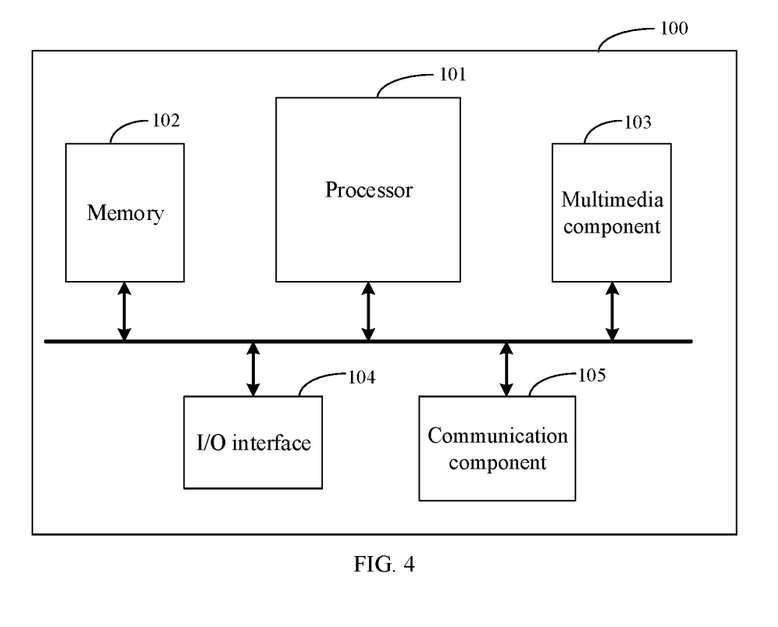
FIG. 4 is a schematic structural diagram of an electronic device according to an embodiment of the present disclosure.

Reference is made to FIG. 4, which is a schematic structural diagram of an electronic device according to an embodiment of the present disclosure. The electronic device 100 may include a processor 101 and a memory 102, and may further include one or more of a multimedia component 103, an information input/output (I/O) interface 104, and a communication component 105.

The processor 101 is configured to control overall operations of the electronic device 100 to complete all or a part of the steps in the method for task scheduling described above. The memory 102 is configured to store various types of data to support operations of the electronic device 100, which may include, for example, instructions for any application or method operating on the electronic device 100, as well as application-related data. The memory 102 may be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The multimedia component 103 may include a screen and an audio component. The screen may be a touch screen, for example, and the audio component is configured for outputting and/or inputting audio signals. For example, the audio component may include a microphone for receiving external audio signals. The received audio signals may be further stored in the memory 102 or transmitted through the communication component 105. The audio assembly also includes at least one speaker for outputting audio signals. The I/O interface 104 is configured to provide an interface between the processor 101 and other interface modules, such as a keyboard, a mouse, a button, etc. These buttons may be virtual buttons or physical buttons. The communication component 105 is configured for wired or wireless communication between the electronic device 100 and other devices. Wireless communication may be for example Wi-Fi, Bluetooth, near field communication (NFC for short), 2G, 3G or 4G, or one or more of them, so a corresponding communication component 105 may include: a Wi-Fi component, a Bluetooth component and an NFC component.

The electronic device 100 may be implemented by one or more application specific integrated circuits (ASIC), digital signal processor (DSP for short), digital signal processing device (DSPD for short), programmable logic device (PLD for short), field programmable gate array (FPGA for short), controller, microcontroller, microprocessor or other electronic components, which are configured to execute the method for task scheduling provided in the above embodiments.

In the following, a computer-readable storage medium provided in the embodiment of the present disclosure is introduced, and the computer-readable storage medium described below and the method for task scheduling described above may be referred to each other correspondingly.

A computer-readable storage medium is further provided in the present disclosure, and a computer program is stored on the computer-readable storage medium, and the computer program, when executed by the processor, implements steps of the method for task scheduling.

The computer-readable storage medium may include: a USB flash drive, a removable hard drive, a read-only memory (ROM), a random access memory (RAM), a magnetic disk, an optical disk and other media that may store program codes.

All the embodiments in this specification are described in a progressive way, and each embodiment focuses on differences from other embodiments. The same or similar parts among the embodiments may be referred to each other. As for the apparatus disclosed in the embodiment, because it corresponds to the method disclosed in the embodiment, description is relatively simple, and relevant aspects may only be referred to description in a method section.

It may be further realized by those skilled in the art that units and algorithm steps of respective examples described in connection with embodiments disclosed herein may be realized in electronic hardware, computer software or a combination of the both. In order to clearly illustrate interchangeability of hardware and software, components and steps of respective examples have been generally described by functions in the above description. Whether these functions are implemented in hardware or software depends on application and design constraints of technical schemes. Described functions may be implemented for each application using different methods by those skilled in the art, but such implementation should not be considered beyond scope of the present disclosure.

Steps of a method or algorithm described in connection with the embodiments disclosed herein may be directly implemented in hardware, a software module executed by a processor, or a combination thereof. The software module may be placed in a random access memory (RAM), an internal memory, a read-only memory (ROM), an electrically programmable ROM, an electrically erasable programmable ROM, a register, a hard disk, a removable disk, a CD-ROM, or any other form of storage medium known in the art.

Finally, it should also be noted that relational terms herein such as first and second, etc., are used merely to distinguish one entity or operation from another entity or operation, and do not necessarily require or imply there is any such relationship or order between these entities or operations. Furthermore, the terms "including" or any variations thereof are intended to embrace a non-exclusive inclusion, such that a process, method, article, or device including a plurality of elements includes not only those elements but also includes other elements not expressly listed, or also incudes elements inherent to such a process, method, article, or device.

In this document, examples are used to explain principle and implementations of the present disclosure. Explanations of the embodiments described above are only used to facilitate understanding of methods and core ideas of the present disclosure. Meanwhile, changes may be made to the specific implementation and application scope by ordinary skilled in the art according to the ideas of the present disclosure. To sum up, contents of this specification should not be construed as limitation to the present disclosure.

The invention claimed is:

1. A method for task scheduling, comprising:
splitting a task requirement to obtain a plurality of subtasks with constraint relationships when the task requirement is acquired;
performing execution condition detection on a non-candidate subtask, determining the non-candidate subtask that meets execution conditions as a candidate subtask, and placing the candidate subtask into a task queue;
performing state detection on a server network composed of edge servers to obtain server state information and communication information;
inputting the server state information, the communication information and queue information corresponding to the task queue into an action value evaluation model to obtain a plurality of evaluation values corresponding to a plurality of scheduling actions; and
determining a target scheduling action among the plurality of scheduling actions by using the evaluation values, and scheduling the candidate subtask in the task queue based on the target scheduling action;
performing the execution condition detection on the non-candidate subtask comprises:
judging whether the non-candidate subtask is a requirement starting task;
determining that the non-candidate subtask meets the execution condition when the non-candidate subtask is the requirement starting task;
judging whether preorder tasks of the non-candidate subtask are all completely executed when the non-candidate subtask is not the requirement starting task;
determining that the non-candidate subtask meets the execution condition when the preorder tasks are all completely executed; and
determining that the non-candidate subtasks do not meet the execution condition when the preorder tasks are not all completely executed.

2. The method for task scheduling according to claim 1, wherein performing the state detection on the server network composed of edge servers to obtain the server state information and the communication information comprises:
performing remaining calculation time detection on the edge servers to obtain the server state information; and
performing remaining transmission time detection on network channels in the server network to obtain the communication information.

3. The method for task scheduling according to claim 1, wherein a training process of the action value evaluation model comprises:
acquiring a plurality of training data, and inputting the plurality of training data into an initial network to obtain a plurality of training evaluation values corresponding to the training data;
determining target training scheduling action by using the training evaluation values, performing task scheduling according to the target training scheduling action, and obtaining a performance parameter corresponding to the respective training data;
obtaining a target evaluation value by using the performance parameter, and obtaining a loss value by using the training evaluation values and the target evaluation value; and
updating the initial network by using the loss value, and obtaining the action value evaluation model by iterative training.

4. The method for task scheduling according to claim 3, wherein acquiring the plurality of training data comprises:
judging whether a number of candidate training data reaches a sampling threshold;
generating new candidate training data by using the training data and the performance parameter corresponding to a last training round when the number of candidate training data reaches the sampling threshold, and randomly selecting a sampling threshold number of training data from the candidate training data;
determining latest candidate training data from the candidate training data when the number of candidate training data does not reach the sampling threshold, and inputting the latest candidate training data into the initial network to obtain the plurality of training evaluation values corresponding to respective scheduling actions;
determining a training scheduling action by using the training evaluation values, and performing the task scheduling based on the training scheduling action;
performing state detection on the server network after the task scheduling is carried out, and generating post-scheduling environment information by using obtained post-scheduling state information, post-scheduling communication information and post-scheduling queue information corresponding to the task queue; and
obtaining a training performance parameter corresponding to the training scheduling action by using the post-scheduling environmental information, generating the target training data by using the training performance parameter, the post-scheduling environmental information, the training scheduling action and the latest candidate training data, and determining the target training data as the candidate training data.

5. The method for task scheduling according to claim 4, wherein obtaining the training performance parameter corresponding to the training scheduling action by using the post-scheduling environmental information comprises:
obtaining a task processing delay by using data processing time and data transmission time of the subtasks to be scheduled involved in the training scheduling action;
performing remaining calculation time detection on servers to be scheduled involved in the training scheduling action to obtain the remaining calculation time;
adding the task processing delay and the remaining calculation time to obtain task delays corresponding to the servers to be scheduled; and
obtaining an average delay by using the task delays, and determining the average delay as the training performance parameter.

6. The method for task scheduling according to claim 1, wherein splitting the task requirement to obtain the plurality of subtasks with constraint relationships comprises:
performing subtask detection on the task requirement to obtain the plurality of subtasks; and
performing input data and output data detection on the plurality of subtasks to obtain a detection result, and obtaining the constraint relationships among the subtasks based on the detection result.

7. An electronic device, comprising a memory and a processor, wherein:
   the memory is configured for storing a computer program; and
   the processor is configured for executing the computer program to realize the method for task scheduling according to claim 1.

8. A computer-readable storage medium, applied for storing a computer program, wherein the computer program, when executed by a processor, implements the method for task scheduling according to claim 1.

9. The method for task scheduling according to claim 1, wherein the task requirement is a computing task performed by using an edge computing network.

10. The method for task scheduling according to claim 1, wherein the task requirement is expressed as:

$$Req=\{\{SubTask_k\}_{k\in K}, \{t_w\}_{w\in W}\}$$

wherein $Subtask_k$ represents a k-th subtask with a total of K subtasks; $t_w$ represents timing constraint and logical sequence constraint between the subtasks; and W represents a set of edges.

11. The method for task scheduling according to claim 10, wherein for each subtask, $$Subtask_i=\{\{Dt_n\}_{n\in N}, \{t_w\}_{w\in W_i}, Proc\}$$

wherein $Dt_n$ is input data obtained from other edge servers required by the subtask; N is a set of edge servers; $Dt_n$ is input data obtained from an n-th edge server; Proc is a request of the subtask for computing resources of the edge server; and $W_i$ is a set of timing constraints and logical sequence constraints corresponding to an i-th subtask.

12. The method for task scheduling according to claim 1, wherein the constraint relationships are configured to constrain execution orders, input data and execution intervals of the subtasks.

13. The method for task scheduling according to claim 1, wherein the preorder tasks are subtasks that has a direct constraint relationship with a certain subtask and is located before the certain subtask in a task logical order.

14. The method for task scheduling according to claim 1, wherein the server state information is information reflecting a load pressure of a server, and the server state information comprises information about remaining computing time of the server, and usage rate information of a processor.

15. The method for task scheduling according to claim 2, wherein the communication information is information that reflects usage of the network channels in the server network, and the communication information comprises bandwidth usage rate information of the network channels, remaining transmission time of the network channels.

16. The method for task scheduling according to claim 1, wherein the queue information is information that reflects task situations of the candidate subtasks in the task queue, and the queue information comprises data amount of input data of the candidate subtasks and allowable waiting time corresponding to the candidate subtasks.

17. The electronic device according to claim 7, wherein performing the state detection on the server network composed of edge servers to obtain the server state information and the communication information comprises:
   performing remaining calculation time detection on the edge servers to obtain the server state information; and
   performing remaining transmission time detection on network channels in the server network to obtain the communication information.

18. The electronic device according to claim 7, wherein a training process of the action value evaluation model comprises:
   acquiring a plurality of training data, and inputting the plurality of training data into an initial network to obtain a plurality of training evaluation values corresponding to the training data;
   determining target training scheduling action by using the training evaluation values, performing task scheduling according to the target training scheduling action, and obtaining a performance parameter corresponding to the respective training data;
   obtaining a target evaluation value by using the performance parameter, and obtaining a loss value by using the training evaluation values and the target evaluation value; and
   updating the initial network by using the loss value, and obtaining the action value evaluation model by iterative training.

19. The electronic device according to claim 18, wherein acquiring the plurality of training data comprises:
   judging whether a number of candidate training data reaches a sampling threshold;
   generating new candidate training data by using the training data and the performance parameter corresponding to a last training round when the number of candidate training data reaches the sampling threshold, and randomly selecting a sampling threshold number of training data from the candidate training data;
   determining latest candidate training data from the candidate training data when the number of candidate training data does not reach the sampling threshold, and inputting the latest candidate training data into the initial network to obtain the plurality of training evaluation values corresponding to respective scheduling actions;
   determining a training scheduling action by using the training evaluation values, and performing the task scheduling based on the training scheduling action;
   performing state detection on the server network after the task scheduling is carried out, and generating post-scheduling environment information by using obtained post-scheduling state information, post-scheduling communication information and post-scheduling queue information corresponding to the task queue; and
   obtaining a training performance parameter corresponding to the training scheduling action by using the post-scheduling environmental information, generating the target training data by using the training performance parameter, the post-scheduling environmental information, the training scheduling action and the latest candidate training data, and determining the target training data as the candidate training data.

20. The electronic device according to claim 19, wherein obtaining the training performance parameter corresponding to the training scheduling action by using the post-scheduling environmental information comprises:
   obtaining a task processing delay by using data processing time and data transmission time of the subtasks to be scheduled involved in the training scheduling action;
   performing remaining calculation time detection on servers to be scheduled involved in the training scheduling action to obtain the remaining calculation time;
   adding the task processing delay and the remaining calculation time to obtain task delays corresponding to the servers to be scheduled; and obtaining an average delay by using the task delays, and determining the average delay as the training performance parameter.

* * * * *